United States Patent [19]
Lauersdorf et al.

[11] Patent Number: 5,964,044
[45] Date of Patent: Oct. 12, 1999

[54] CONVEYOR OVEN USABLE AS PRE-BAKE OVEN IN A PRINT PLATE IMAGING AND PROCESSING SYSTEM AND METHOD OF USING SAME

[75] Inventors: Duane H. Lauersdorf, Watertown; David A. Strand, Elkhorn, both of Wis.

[73] Assignee: Wisconsin Oven Corporation, East Troy, Wis.

[21] Appl. No.: 08/783,607

[22] Filed: Jan. 14, 1997

[51] Int. Cl.$^6$ ................................ A21B 1/00; F24C 13/32
[52] U.S. Cl. ................................ 34/224; 34/225; 34/226; 126/21 A
[58] Field of Search .......................... 126/21 A; 34/224, 34/225, 232

[56] References Cited

U.S. PATENT DOCUMENTS

| | | | |
|---|---|---|---|
| 4,204,340 | 5/1980 | Doucin et al. | 34/225 |
| 4,341,024 | 7/1982 | Witkin | 34/225 X |
| 4,377,109 | 3/1983 | Brown et al. | 126/21 A X |
| 4,462,383 | 7/1984 | Henke et al. | 126/21 A |
| 4,679,542 | 7/1987 | Smith et al. | 126/21 A |
| 4,873,107 | 10/1989 | Archer | 126/21 A X |
| 4,951,648 | 8/1990 | Shuka et al. | 34/225 X |
| 4,960,100 | 10/1990 | Pellicane | 126/21 A |
| 4,964,392 | 10/1990 | Bruno et al. | 126/21 A |
| 5,025,775 | 6/1991 | Crisp | 126/21 A |
| 5,303,660 | 4/1994 | Lauersdorf | 110/336 |
| 5,584,237 | 12/1996 | Moshonas | 126/21 A |

OTHER PUBLICATIONS

Brochure entitled: *The Plate Converter*, Wisconsin Oven.
Brochure entitled: *Print Plate Ovens*, Conveyor Type SPC–HTS/109 Series, Wisconsin Oven (Standard Oven Division).

*Primary Examiner*—Christopher B. Kilner
*Attorney, Agent, or Firm*—Nilles & Nilles

[57] ABSTRACT

A conveyor oven is capable of heating precisely and uniformly an article to be baked as the article is conveyed through the oven at a designated speed. Precise and uniform heating is promoted by 1) a combination supply/return duct assembly positioned above the conveyor and configured to promote uniform airflow towards the upper surface of the conveyor, and 2) discharge orifices configured to further promote uniform airflow from the supply ducts without generating whistling or other unpleasant noises. The arrangement of this supply/return duct assembly, incorporating both supply and return ducts in the same plane, also promotes a low profile oven—an important consideration in applications in which minimizing space is a priority. The profile of the oven is reduced further by placing the heating element beneath the conveyor and by configuring supply and return passages to circulate air between the heat source and the supply/return duct assembly using minimal space. This air recirculation, preferably enhanced by seals at appropriate locations within the oven, also significantly increases the oven's thermal efficiency and its ability to distribute heat uniformly. The oven is especially well suited for use as a pre-bake oven in a print plate imaging and processing system.

25 Claims, 6 Drawing Sheets

CONVEYOR OVEN USABLE AS PRE-BAKE OVEN IN A PRINT PLATE IMAGING AND PROCESSING SYSTEM AND METHOD OF USING SAME

BACKGROUND OF THE INVENTION

1. Field of the Invention

The invention relates to conveyor ovens and, more particularly, to ovens in which a plate or the like is baked by directing hot air downwardly onto the upper surface of the plate from above so as to heat the upper surface of the plate uniformly. The invention is particularly useful as a pre-bake oven in a print plate imaging and processing system. The invention additionally relates to a method of using a pre-bake oven.

2. Discussion of the Related Art

So-called conveyor ovens are well known for baking plates and other relatively flat articles. Conveyor ovens are characterized by an oven having an opening through which a conveyor extends. The conveyor transports the article to be baked through the oven at a designated rate such that the article is heated to a desired temperature as it is conveyed through the oven. Conveyor ovens are used in a variety of applications.

For example, in direct print plate imaging and processing systems, conveyor ovens are used to heat print plates prior to development in order to render the background areas of the image soluble in the downstream alkaline developer of the system while simultaneously rendering the image areas insoluble. Precise and consistent heating of the print plate is essential. If the pre-baking or pre-heating step results in more than about a 2° C. temperature variation across the print plate's surface, adverse effects will occur. For instance, if any portions of the plate are overheated, a thermal fog, having an appearance similar to so-called "light fog" found in conventional plates, will form in the overheated areas. Conversely, if uneven or imprecise heating leads to unacceptably low temperatures on portions of the plate, polymers in the portions of the plate which are insufficiently heated will fail to cross-link sufficiently, resulting in a weakened or removed image. Many conveyor ovens which were heretofore available did not provide adequate precision and uniformity of heating to operate acceptably as pre-bake ovens.

Conveyor ovens are also widely used in other applications such as post-bake ovens in print plate imaging and finishing systems. One such oven is manufactured by Wisconsin Oven Corporation of East Troy, Wis. and marketed as the SPC-HTS/109 Series. This oven works quite well as a post-bake oven but exhibits a relatively high profile because the heating elements, blower, and associated ductwork are all located above the conveyor. In addition, the configuration of the ductwork linking the heat source to the conveyor is less than optimal for height minimization purposes. As a result, this oven and others of its type have an overall height on the order of 74" or more. The relatively high profiles exhibited by these ovens render them somewhat unattractive in applications in which space constraints mandate ovens having the lowest-possible profile.

Many conveyor ovens which were heretofore available also were somewhat inefficient because they employed little or no air recirculation such that all or at least a substantial portion of the air used to bake the subject article was heated from ambient temperature to the working temperature.

OBJECTS AND SUMMARY OF THE INVENTION

It is therefore a primary object of the invention to provide a conveyor oven which is capable of precisely and uniformly heating an article to be baked as that article is conveyed through the oven at a designated speed.

Another object of the invention is to provide a conveyor oven which is well-suited for use in applications where space constraints mandate an oven with a relatively low profile.

Still another object of the invention is to provide a conveyor oven which recirculates its working air and which therefore is relatively efficient to operate.

In accordance with a first aspect of the invention, these and other objects are achieved by providing a conveyor oven comprising a cabinet, a source of heated air, a supply/return duct assembly, and a conveyor. The cabinet includes a plurality of sidewalls and a top wall bridging the sidewalls, an entrance being formed in a first one of the sidewalls, and an exit being formed in a second one of the sidewalls. The conveyor extends from the entrance to the exit and has an upper surface along which travels an article to be baked. The supply/return duct assembly is positioned above the conveyor and has a lower surface which faces the upper surface of the conveyor. The duct assembly includes a plurality of supply ducts and a plurality of return ducts. Each of the supply ducts has (a) a heated air inlet in fluid communication with the source of heated air and (b) a plurality of downwardly-opening discharge orifices formed in the lower surface. Each of the return ducts has at least one wall formed by a wall of an adjacent one of the supply ducts and has (a) a lower inlet which faces the upper surface of the conveyor and (b) an upper outlet which is in fluid communication with the source of heated air.

Preferably, in order to facilitate assembly, promote uniform and efficient airflow, and render the oven more compact, the oven further comprises a plenum which houses at least part of the source of heated air. The plenum has an upper portion formed by the duct assembly, a supply passage assembly being formed within the plenum for conveying heated air from the source of heated air to the inlets of the supply ducts, and a return passage assembly being formed between the plenum and the cabinet for conveying air from the outlets of the return ducts to the source of heated air.

In a particularly preferred configuration, the supply passage assembly comprises a first supply passage extending at least generally in parallel with a first one of the sidewalls of the cabinet. A second supply passage is disposed opposite the first supply passage and extends at least generally in parallel with a second one of the sidewalls of the cabinet. The source of heated air includes a blower having an axial inlet, a first radial outlet in fluid communication with the first supply passage, and a second radial outlet in fluid communication with the second supply passage.

Seals are preferably disposed at the interfaces between the plenum and the cabinet and at the entrance and exit of the cabinet so that ingress of ambient air is minimized and most of the air used to bake the articles is recirculated in a closed loop, thereby rendering the oven more efficient and increasing uniformity of heating.

The supply duct discharge orifices are preferably generally H-shaped to further promote uniform air distribution and to reduce whistling noises that might otherwise occur during oven operation.

Still another object of the invention is to provide an improved print plate imaging and processing system employing an improved pre-bake oven.

In accordance with another aspect of the invention, this object is achieved by providing a print plate imaging and processing system that includes a thermal imaging unit, a pre-bake oven, a developer unit, and a finishing assembly. In the thermal imaging unit, an image is thermally imposed on selected areas of the print plate to create image areas and non-image areas on the print plate. The pre-bake oven is located downstream of the thermal imaging unit. The print plate is heated in this oven sufficiently to partially cross-link polymers in the non-image areas of the print plate. In the developer unit, the pre-baked print plate is immersed in an aqueous alkaline developer. The finishing assembly includes a rinse/gum unit in which baking residues are removed from the print plate and in which a gum finisher is applied to the print plate. The pre-bake oven includes a cabinet, a source of heated air, a supply/return duct assembly, and a conveyor. The cabinet includes a plurality of sidewalls and a top wall bridging the sidewalls, an entrance being formed in a first one of the sidewalls, and an exit being formed in a second one of the sidewalls. The conveyor (a) has an upper surface along which travels the print plate, (b) receives the print plate from the thermal imaging unit, (c) conveys the print plate through the oven, and (d) forwards the print plate towards the developer unit. The supply/return duct assembly (a) is positioned above the conveyor, (b) receives heated air from the source of heated air, (c) directs heated air downwardly onto the upper surface of the conveyor and the print plate so as to heat uniformly the print plate with less than a 2° C. temperature variation across the surface of the print plate, and (d) directs return air upwardly from the print plate and back to the source of heated air.

Preferably, the duct assembly of the pre-bake oven (a) has a bottom surface which faces the upper surface of the conveyor and (b) includes a plurality of supply ducts, each of which has (i) a heated air inlet in fluid communication with the source of heated air and (ii) a plurality of downwardly-opening discharge orifices. The duct assembly further includes plurality of return ducts, each of which has at least one wall formed by a wall of an adjacent one of the supply ducts. Each of the return ducts has a lower inlet which faces the conveyor and an upper outlet which is in fluid communication with the source of heated air.

Yet another object of the invention is to provide an improved method of baking an article as it is conveyed through an oven.

In accordance with another aspect of the invention, this object is achieved by conveying the plate into an oven using a conveyor extending through the oven, then heating air via a source of heated air located within the oven beneath the conveyor. The heated air is then directed onto the plate, from a supply/return duct assembly which is located above the conveyor and which is in fluid communication with the source of heated air, so as to heat uniformly the plate. Return air then flows upwardly from the plate, through the duct assembly, then downwardly around the conveyor, and then back to the source of heated air. The plate is then conveyed out of the oven using the conveyor.

Preferably, the step of directing heated air onto the plate comprises forcing the heated air radially from two radially-opposed outlets of a blower of the source of heated air, then forcing the heated air upwardly around opposed transverse edges of the conveyor and into opposed longitudinal ends of supply ducts of the duct assembly, and then forcing the heated air downwardly through discharge orifices in the supply ducts so as to impinge evenly on an entire upper surface of the plate.

The step of forcing the heated air downwardly through discharge orifices preferably comprises forcing air through H-shaped discharge orifices.

The air preferably is heated in the source of heated air, forced onto the plate, and returned to the source of heated air in a closed loop with essentially no heated air being exhausted from the oven and with essentially no ambient air being drawn into the oven.

Other objects, features, and advantageous of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENT

1. Resume

Pursuant to the invention, a conveyor oven is provided which is capable of precisely and uniformly heating an article to be baked as the article is conveyed through the oven at a designated speed. Precise and uniform heating is promoted by 1) a combination supply/return duct assembly positioned above the conveyor and configured to promote uniform airflow towards the upper surface of the conveyor, and 2) discharge orifices configured to further promote uniform airflow from the supply ducts without generating whistling or other unpleasant noises. The arrangement of this supply/return duct assembly, incorporating both supply and return ducts in the same plane, also promotes a low profile oven—an important consideration in applications in which minimizing space is a priority. The profile of the oven is reduced further by placing the heating element beneath the conveyor and by configuring supply and return passages to circulate air between the heat source and the supply/return duct assembly using minimal space. This air recirculation, preferably enhanced by seals at appropriate locations within the oven, also significantly increases the oven's thermal efficiency and its ability to distribute heat uniformly. The oven is especially well suited for use as a pre-bake oven in a print plate imaging and processing system.

2. System Overview

The inventive conveyor oven is usable in virtually any application in which an article to be baked is heated from above as it is conveyed through the oven. It is particularly well-suited for use in print plate imaging and processing systems which require 1) precise and uniform heat transfer to the print plate and, 2) a relatively low profile to meet space constraints. Print plate imaging and processing systems of this type are gaining widespread acceptance in the industry because they offer reduced make-ready, faster turnaround, and improved quality when compared to prior imaging and processing systems. One such print plate imaging and processing system is illustrated schematically in FIG. 1 and is designated generally by the reference numeral 20. The print plate being acted upon by the system 20 is a pre-sensitized, fully photopolymer aluminum plate which can be imaged digitally using an infrared laser source or conventionally using film negatives. The illustrated system 20 comprises, as its major components, a thermal imaging unit 22, a pre-bake oven 24, a developer 26, and a finishing assembly including a rinse/gum unit 30 and possibly a post-bake oven 28.

Figure 1:
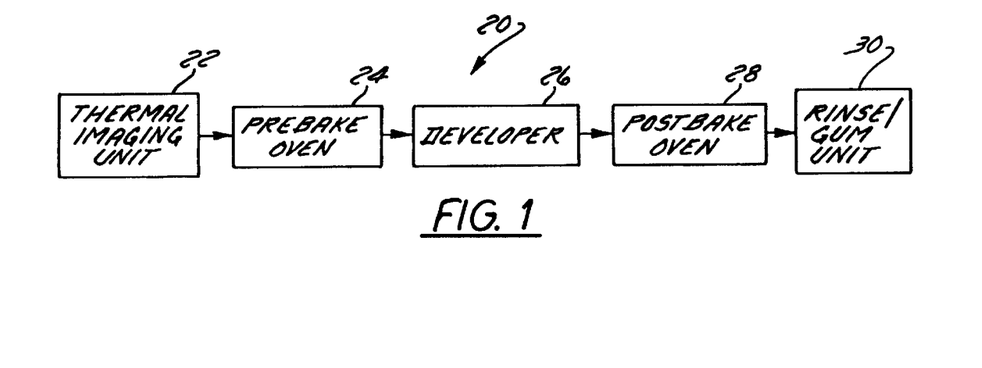
FIG. 1 schematically represents a print plate imaging and processing system employing an oven constructed in accordance with the preferred embodiment of the present invention as a pre-bake oven of the system.

The thermal imaging unit 22 may comprise either a digital imaging device or a conventional imaging device using UV energy. In either event, energy is delivered to the plate's upper surface to create the image and to partially cross-link the polymers in the image areas. The energy takes the form of heat in digital systems and light in conventional systems. Both systems create a latent image on the print plate that is extremely stable.

After receiving the image, the print plate is heated as it is conveyed through the pre-bake oven 24. Pre-baking further cross-links the polymers in the image areas of the print plate and partially cross-links polymers in the non-image areas, thereby making the background soluble in the downstream developer while simultaneously rendering the image areas insoluble.

After leaving the pre-bake oven 24, the print plate is cooled to or near room temperature. It is then conveyed to the developer 26 where it is inmmersed in a developer tank containing an aqueous alkaline developer solution. The solution dissolves non-image areas on the print plate, and polymers in these areas are then removed by action of a scrub roller or the like located within the tank. After the print plate is removed from the tank, water is applied to the plate using a spray bar or the like to remove any remaining background polymer particles and developer residues.

The purpose of the post-bake oven 28 is to completely cross-link the partially cross-linked polymers in the image, thereby increasing the durability or long-run capability of the image. Post-baking, if incorporated into the process, requires that a pre-bake solution be applied to the print plate, preferably at the outlet of the developer 26. This solution protects the image and the background from contaminates such as dirt within the oven 28, as well as from byproducts generated from baking the coating itself.

Whether or not the print plate is post-baked, it should be subjected to finishing in the rinse/gum unit 30 or the like. In this unit 30, water is first applied to the print plate with a spray bar-type system to remove pre-bake solution and any baking residues from the plate. A gum finisher is then applied to the print plate with a spray-bar-type system or the like to protect the background areas from adverse handling and to permit the plate to come to impression faster, i.e., to permit the image to take ink and background shedding ink faster.

The oven 24 could be used as either a pre-bake oven or a post-bake oven in the system 20 or in any other applications requiring conveyor ovens. It is particularly well suited, however, for use as the pre-bake oven because optimal pre-baking requires precise and uniform heat application to the entire upper surface of the print plate. If there is more than about a 2° C. temperature variation across the plate surface, any overheated areas of the print plate exhibit an undesired "thermal fog", and any underheated areas exhibit a weakened image because the polymers of these areas will not be sufficiently cross-linked. The conveyor oven 24 is ideally suited for these purposes and, when used in combination with other conventional components 22, 26, 28, and 30 of the system, provides an improved thermal imaging and processing system 20. The conveyor oven 24 oven will now be detailed.

3. Description of Conveyor Oven

Turning now to FIGS. 2–11 and initially to FIGS. 2–6, a low-profile conveyor oven 24 is illustrated that can be used in a wide variety of applications, including as the pre-bake oven in the print plate imaging and finishing system 20 of FIG. 1. The oven 24 includes a cabinet 32 (often referred to in the art as the oven of an oven assembly), a source of heat 34 located within the cabinet 32, a plenum 36 located within the cabinet 32, and a conveyor assembly 38 extending through the cabinet. The cabinet 32 is encased in a decorative and protective metal facade 40, and the entire assembly is mounted on a support frame assembly 42.

The cabinet 32 preferably comprises an insulated structure commonly used in conveyor ovens of this type. Cabinet 32 includes a front sidewall 44, a rear sidewall 46, a pair of opposed transverse sidewalls 48 and 50, a top wall 52 bridging the tops of all of the sidewalls to enclose the top end of the oven 24, and a bottom wall 54 bridging the bottoms of all of the sidewalls to enclose the bottom of the oven. Each of the sidewalls and top wall is formed from an outer shell, an inner shell, and a layer of insulation is disposed between the inner and outer shells. The shells are typically formed from interconnected sheet-metal panels fastened to one another by suitable fasteners. The construction of the walls 44, 46, 48, 50, 52, and 54, per se, forms no part of the present invention and, accordingly, will not be detailed.

An entrance opening 56 is formed through the front sidewall 44 of the cabinet 32, and an exit opening 58 is formed through the rear sidewall 46 in the same horizontal plane as the entrance opening 56. As can best be seen in FIGS. 4–6, the width of the resulting conveyor opening 60 is substantially less than the width of the oven chamber so as to accommodate ductwork for the flow of supply air and return air around the conveyor opening 60 as detailed below.

Figure 2:
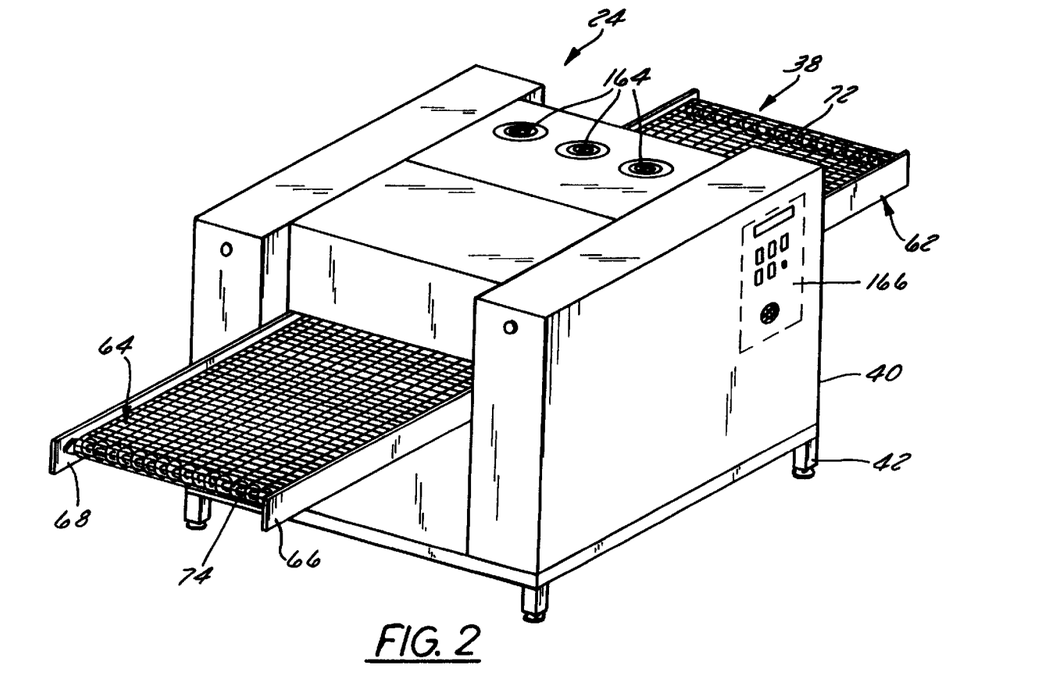
FIG. 2 is a perspective view of the pre-bake oven of the system of FIG. 1.
Figure 3:
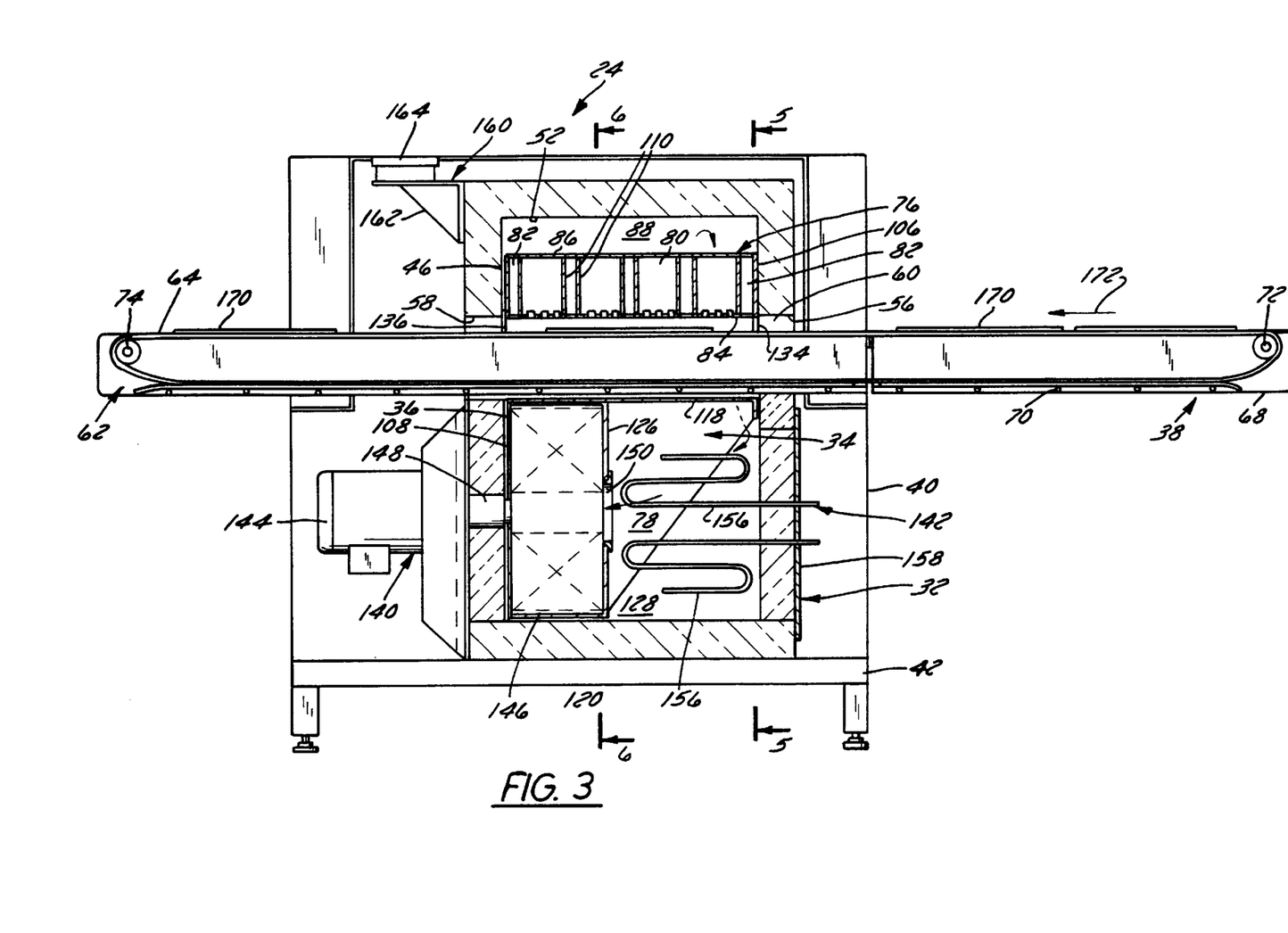
FIG. 3 is a side sectional elevation view of the oven of FIG. 2.
Figure 4:
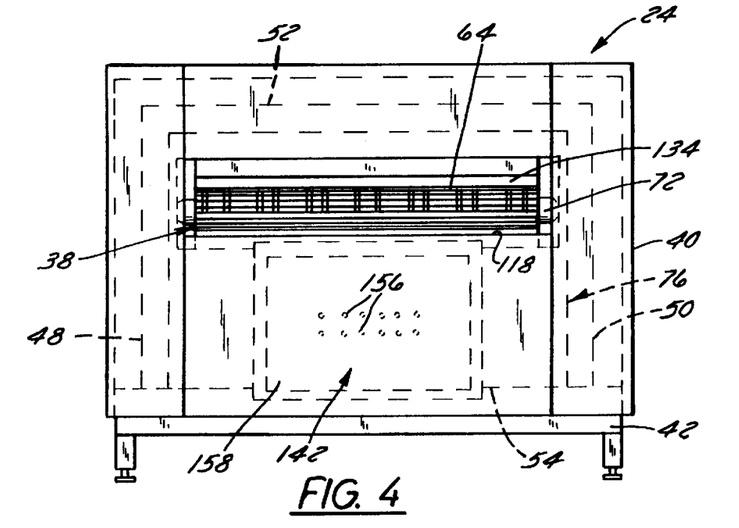
FIG. 4 is a front end view of the oven of FIGS. 2 and 3.
Figure 5:
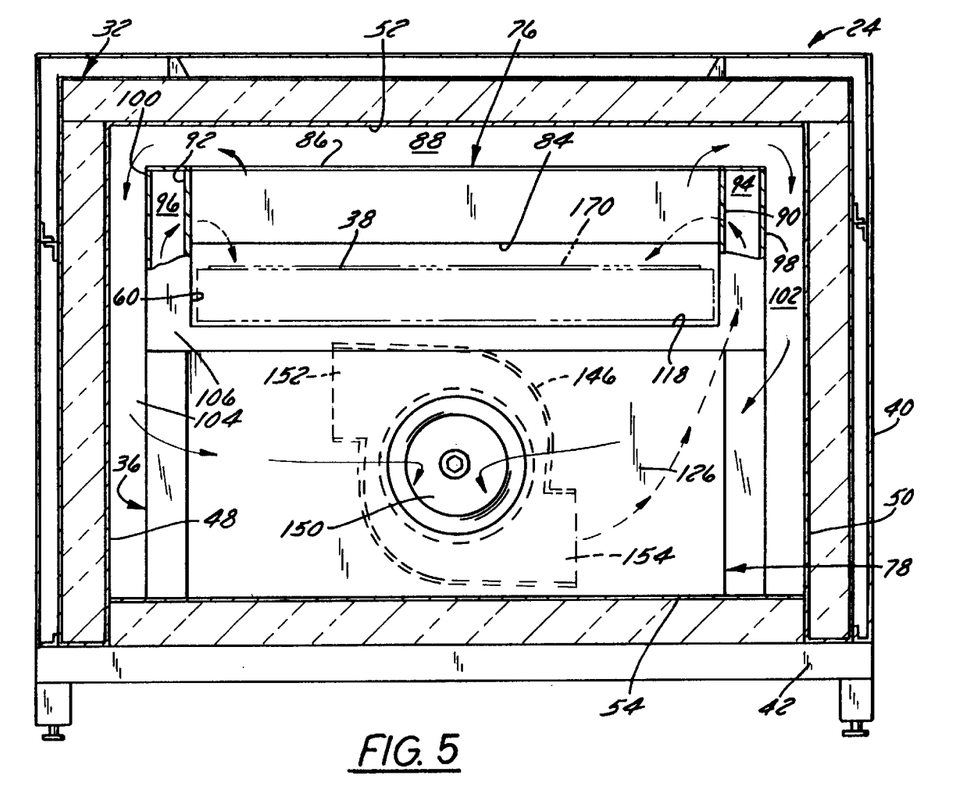
FIG. 5 is a partially cut-away sectional end-elevation view of the oven of FIGS. 2–4, taken generally along the line 5—5 in FIG. 3 and omitting the heating elements and portions of the cabinet for the sake of convenience.

The conveyor assembly 38 may comprise any known conveyor assembly capable of conveying plates or other articles through the oven 24 at a designated rate. Referring to FIGS. 2–4, the illustrated conveyor assembly 38 includes a slide bed 62 and an endless conveyor 64. The slide bed 62 is mounted on the floor 118 of the conveyor opening 60 and includes 1) a pair of laterally opposed side braces 66 and 68 and 2) a grid of interconnected support rods 70 linking the side braces 66 and 68 to one another. A drive sprocket assembly 72 is mounted at the front of the slide bed 62 and is driven by an electric motor (not shown). A guide sprocket 74 assembly is mounted at the rear of the slide bed 62. The conveyor 64 is driven by the drive sprocket assembly 72 and guided by the support rods 70 and the guide sprocket assembly 74. The conveyor 64 preferably comprises a conventional wire belt conveyor formed from a mesh of interconnected steel wires.

Figure 7:
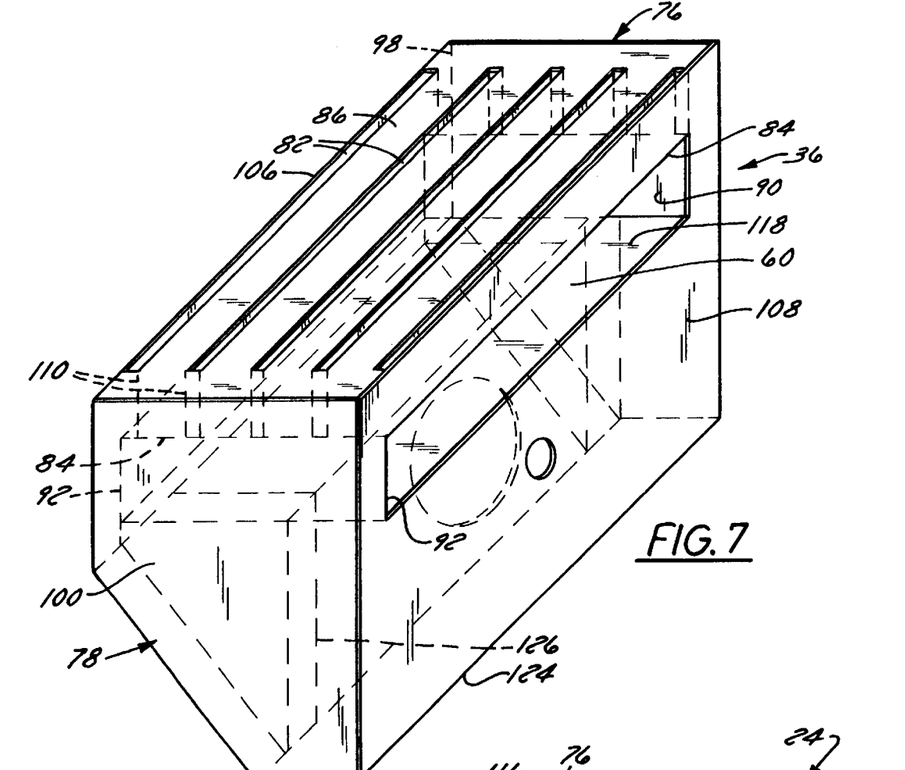
FIG. 7 is a perspective view of the plenum of the oven of FIGS. 2–6.

The plenum 36 serves several functions. First, it incorporates a supply/return duct assembly 76 at its upper end. Second, it presents a housing 78 at its lower end which at least partially houses the heat source 34. Third, the interior portion of the conveyor opening 60 is formed through it. Fourth, it cooperates with the sidewalls 48 and 50 of the cabinet 32 to recirculate air between the heat source 34 and the supply/return duct assembly 76. All of these functions are achieved using a remarkably compact structure.

The supply/return duct assembly 76 is positioned vertically between the conveyor 64 and the top wall 52 of the cabinet 32 and is characterized by the presentation of both supply and return ducts in the same horizontal plane. The duct assembly 76 is formed from sheet metal and shares many of its walls with walls of other portions of the plenum. Duct assembly 76 extends transversely with respect to the conveyor opening 60 and is rectangular in transverse cross section and in longitudinal cross section. It has a lower surface or wall 84 facing the upper surface of the conveyor 64, an upper surface or wall 86 facing the top wall 52 of the cabinet 32 to define a return air chamber 88 therebetween, and presents a plurality of interleaved or alternating supply ducts 80 and return ducts 82. First and second longitudinally-opposed transverse end walls 90 and 92 each define the inner edge of a respective supply passage 94, 96. Each of these walls 90 and 92 is notched in a saw-toothed fashion to form inlets of the supply ducts 80 while closing-off the ends of the adjacent return ducts 82. Third and fourth longitudinally-opposed transverse end walls 98, 100 are located longitudinally beyond the first and second end walls 90 and 92, respectively. Each of these end walls 98, 100 defines an outer edge of a supply passage 94, 96 and an inner edge of a corresponding return passage 102, 104. First and second transversely opposed edge walls 106, 108 extend longitudinally from the third end wall 98 to the fourth end wall 100 and define outer walls of the outermost return ducts 82. A plurality of intermediate walls 110 extend longitudinally from the first end wall 90 to the second end wall 92 such that each wall 100 defines a transverse edge of both a supply duct 80 and an adjacent return duct 82. Hence, each of the supply ducts 80 is flanked by a pair of return ducts 82. Each of the return ducts 82 of the resulting structure has a lower inlet which faces the upper surface of the conveyor 64 and an upper outlet opening into the return air chamber 88.

Each of the supply ducts 80 has a plurality of downwardly-opening discharge orifices 112 formed in the bottom surface 84 of the duct assembly 76. The discharge orifices 112 are carefully constructed to maximize uniform distribution of discharged air. Various configurations of discharge orifices were investigated with varying degrees of success. It was discovered that providing a large number of round orifices promoted somewhat uniform air distribution during oven operation but resulted in an unpleasing whistling noises. Other discharge orifice configurations were rejected because they did not provide the requisite uniformity of air distribution.

Figures 10, 12:
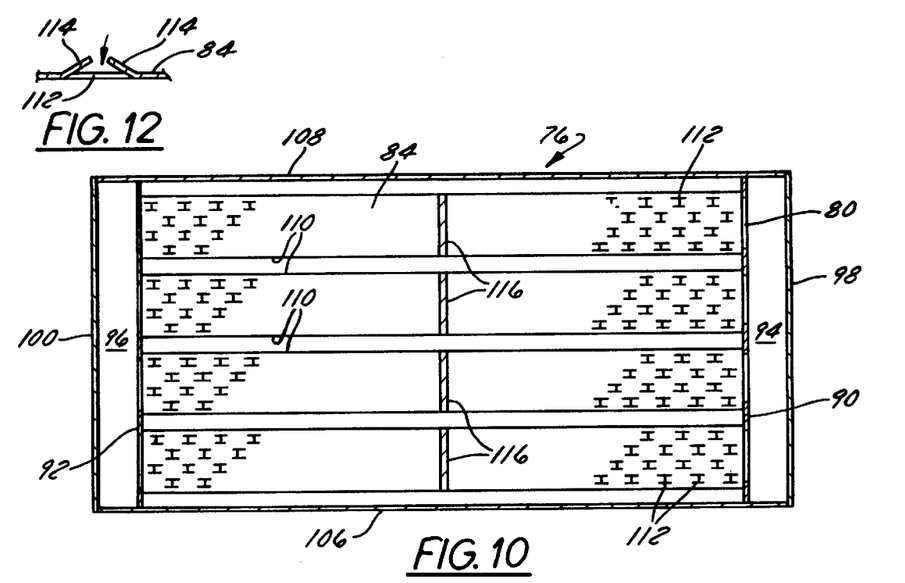
FIG. 10 is a sectional top plan view of the plenum, taken through the supply/return duct assembly thereof.
FIG. 12 is a fragmentary sectional side elevation view of one of the discharge orifices of the supply/duct return assembly.
Figure 11:
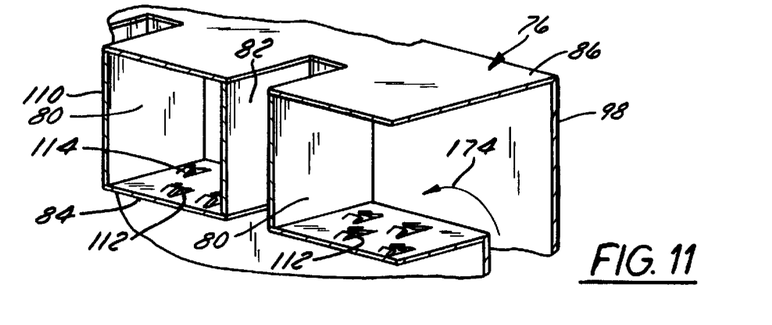
FIG. 11 is a fragmentary perspective view of the supply/return duct assembly.

The preferred orifices comprise a pattern of H-shaped orifices 112 formed in the bottom wall 84 of the duct assembly 76 as best seen in FIGS. 10–12. These orifices 112 are formed by slitting the bottom wall 84 in an "H" pattern and by punching the resulting tabs 114 upwardly as best seen in FIGS. 11 and 12. H-shaped orifices, used in other applications such as the relatively large oven disclosed, for example, in U.S. Pat. No. 5,303,660, were initially rejected as an orifice option because it was thought that such discharge orifices would not provide sufficiently uniform airflow distribution for use in a pre-bake oven. However, it has been discovered that properly sized and arranged H-shaped discharge orifices 112 meet the uniformity requirement while avoiding the whistling problems associated with some other orifices. Use of this H pattern also was found to increase spreadability i.e., to increase distribution from the supply ducts 80. Orifices having a length of about 2", a width of about 1", and a density of about 25 orifices per square foot proved optimal.

A breaker 116 (FIGS. 6 and 10) extends transversely across an intermediate longitudinal section of each of the supply ducts 80 so as to essentially prevent airflow therepast. These breakers 116 promote turbulence within the supply ducts 80 and hence improve uniform air distribution from the supply ducts. Each of the breakers 116 is preferably formed from a piece of sheet metal attached to the walls 110 of the duct 80 in which the breaker 116 is located.

The interior portion of the conveyor opening 60 includes a floor 118, a ceiling formed by the bottom surface 84 of the duct assembly 76, and a pair of opposed sidewalls formed from the walls 90 and 92 of the duct assembly 76. All of the walls extend from the entrance 56 of the cabinet 32 to the exit 58. The supply passages 94, 96 and return passages 102, 104 extend vertically between the sidewalls 90, 92 of the conveyor opening 60 and the corresponding transverse sidewalls 50, 52 of the cabinet 32.

The housing portion 78 of the plenum 36 forms a heated air chamber 122 bounded at its lower end by a bottom wall 124 of the plenum 36, at its rear end by the first edge wall 108, at its longitudinal ends by walls formed by extensions of the third and fourth end walls 98 and 100 of the duct assembly 76, at its upper end by the floor 118 of the conveyor opening 60, and at its front end by a vertical wall 126. Heated air chamber 122 is in direct fluid communication with the inlets of the fist and second supply passages 94 and 96 which, as discussed above, are in turn in direct fluid communication with the inlets of the supply ducts 80. A partially-enclosed heater element chamber 128 is located in front of the heated air chamber 122. Heater element chamber 128 is bounded at its rear end by the wall 126, at its upper end by the floor 118 of the conveyor opening 60, and at its front end by an extension of the edge wall 106 of the duct assembly 76 which is slanted downwardly and rearwardly in this portion of the plenum 36 so as to render the chamber 128 substantially triangular in cross-section. Heater element chamber 128 is in direct fluid communication with the fist and second return passages 102 and 104 which, as discussed above, are in turn in direct fluid communication with the return air chamber 88 and hence the outlets of the return ducts 82.

Figure 8:
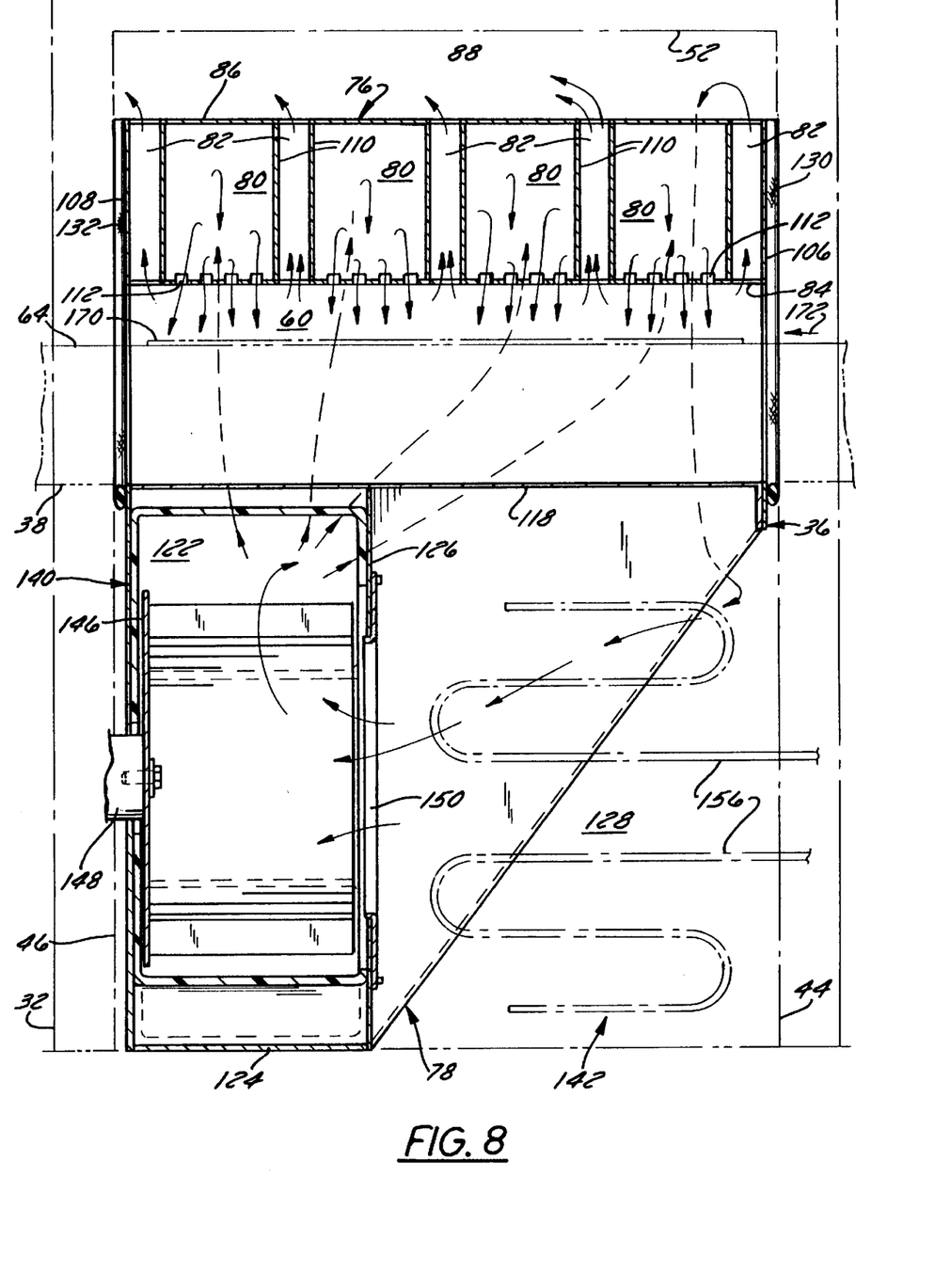
FIG. 8 is a fragmentary side sectional elevation view of a portion of the oven of FIGS. 2–6, illustrating supply and return airflow therethrough.
Figure 9:
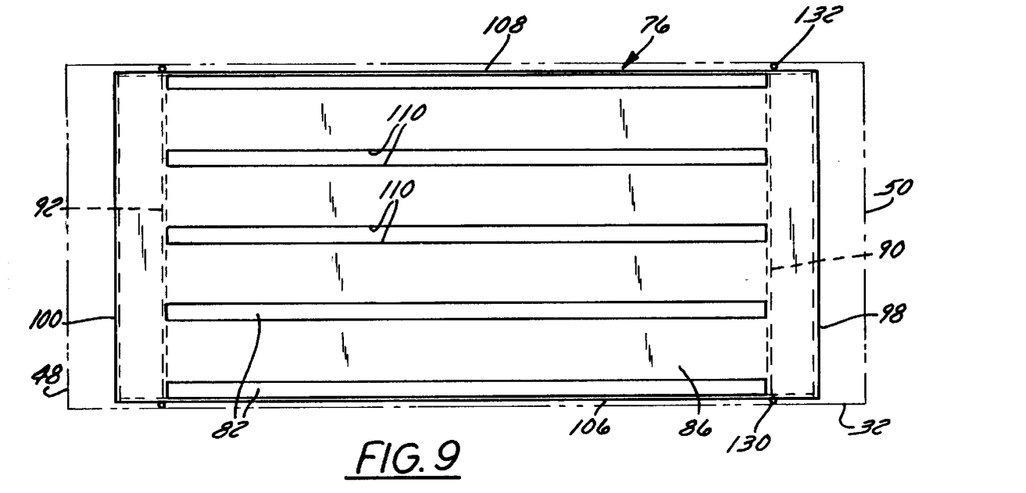
FIG. 9 is a top plan view of the plenum of the oven of FIGS. 2–6 with the surrounding cabinet being illustrated in phantom lines.

Measures are preferably taken to prevent ingress of ambient air as much as practically possible so that essentially the same air mass is continuously recirculated through the oven 24. This closed-loop recirculation reduces energy expenditure and also promotes more uniform heating. In order to promote this closed-loop recirculation, the edge walls 106 and 108 are sealed to the corresponding front and rear sidewalls 44 and 46 of the cabinet 32. Referring to FIGS. 8 and 10, the seals preferably comprise tadpole seals 130 and 132 of known configuration. These seals also preferably extend across the bottom edge of the cabinet entrance 56 and exit 58. In addition, so-called profile curtains 134 and 136, taking the form of fiberglass gaskets, are mounted at the upper portions of the entrance 56 and exit 58 of the cabinet 32 and extend downwardly to a position closely adjacent the upper surface of the conveyor 64 as best seen in FIG. 3 so as to permit passage of the conveyor 64 and of the articles to be baked while minimizing inflow of ambient air.

The source of heated air 34 could comprise any assembly capable of heating air and of recirculating the heated air between the source and the supply/return duct assembly 76. The preferred and illustrated assembly comprises a direct drive blower assembly 140 and a heater plug assembly 142. The blower assembly 140 comprises an electrical motor 144 mounted on the rear sidewall 46 of the cabinet 32 and a blower 146 disposed within the heated air chamber 122. An output shaft 148 of the motor 144 extends through the plenum wall 108 to support and drive the blower 146. The blower 146 presents an axial inlet 150 opening into the heater element chamber 128 and at least one, and preferably two opposed radial outlets 152 and 154 opening into the heated air chamber 122. The illustrated two-outlet configuration is preferred because it maximizes air distribution uniformity by forcing heated air into both ends of the supply ducts 80.

The heater plug assembly 142 (best seen in FIGS. 3, 4, and 8) comprises a plurality of electrical coils or heater elements 156 disposed within the chamber 128 upstream of the blower inlet 150. The heater elements 156 are mounted on a support panel 158 forming a portion of the front sidewall 44 of the cabinet 32.

In some applications, such as in a print plate imaging and processing system, it is desirable that the oven 24 incorporate measures to cool the baked articles as they exit the oven. Such cooling, if provided, should be controlled to adequately cool the article to be baked without overcooling and without blowing cold air back into the oven. Cooling is achieved in the illustrated embodiment using a cooling fan assembly 160 located within the facade 40 but outside of the cabinet 32 as illustrated in FIGS. 2 and 3. The cooling fan assembly 160 comprises a support 162 and a system of three electrical fans 164. The support 162 is mounted on the rear sidewall 46 of the cabinet 32 at a location above the exit opening 58. The fans 164 are mounted on the support 162 and extend through openings in the upper surface of the facade 40. The fans 164 blow ambient air onto the baked articles as the articles exit the conveyor oven 24 so as to cool the articles without forcing relatively cold ambient air into the oven 24.

Finally, a control panel 166 (FIG. 2) is mounted on the facade 40 to permit individual control of the various controlled components of the oven 24. The control devices forming the panel include several devices for controlling the speed of the conveyor 64, the output of the blower 146, the power supply to the heater elements 156, and the speed of the cooling fans 164. Control panel 166 preferably includes a temperature controller which sets and monitors the temperature of the oven 24, ON-OFF switches for the blower 146, heater plug assembly 142 and conveyor 64, and an over-temperature alarm. The temperature controller comprises a suitable dial or the like to set a temperature and suitable displays which display the current temperature and the set temperature. A separate conveyor speed control dial is also provided to permit the operator to vary the speed at which articles are conveyed through the oven 24.

4. Operation of Conveyor Oven

Figure 6:
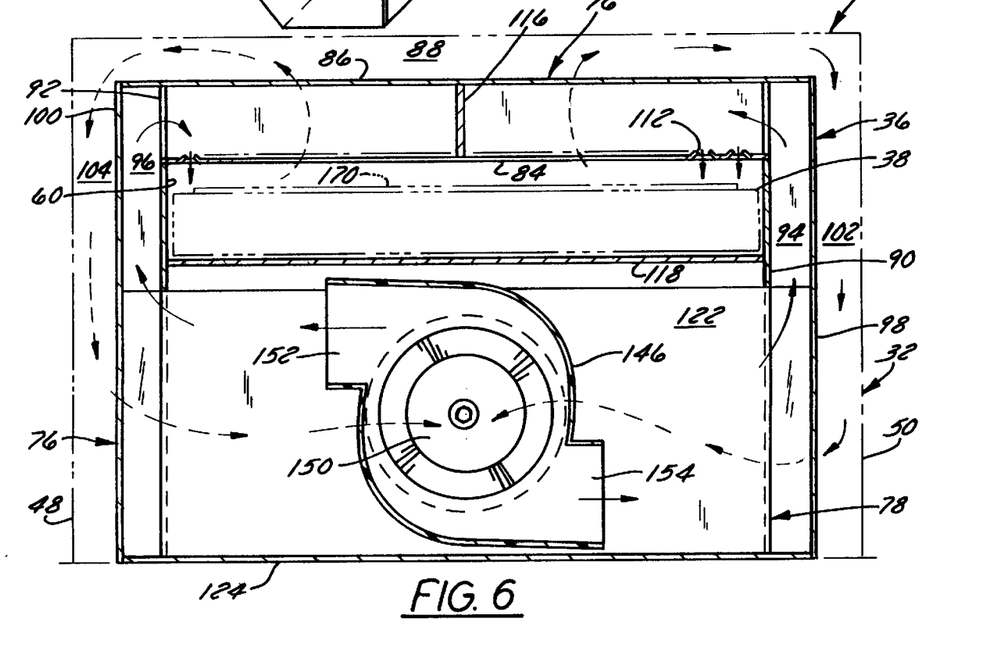
FIG. 6 is a sectional end elevation view of the oven of FIGS. 2–5, taken generally along the lines 6—6 in FIG. 3 and omitting the heating elements and portions of the cabinet for the sake of convenience.

In operation, an article to be baked such as a print plate 170 is mounted on the upper surface of the conveyor 64 and is conveyed into the entrance 56 of the oven 24 and thence through the oven in the direction of the arrows 172 in FIGS. 3 and 8. Air is heated in the heater element chamber 128 by the heater elements 156 and then drawn into the inlet 150 of the blower 146. As best seen in FIGS. 6, 8, and 11, the hot air is discharged from the radial outlets 152 and 154 of the blower 146 and into the heated air chamber 122, then flows into the supply passages 94 and 96, upwardly around the conveyor opening 60 through the supply passages, and then into the inlets of the supply ducts 80 as best seen by the arrow 174 seen in FIG. 11. The hot air then flows longitudinally through the supply ducts 80 from both ends and is forced downwardly through the H-shaped discharge openings 112 so that it impinges on the upper surface of the article 170 being baked. The distribution of the discharged air is extremely precise for at least two reasons. First, uniform airflow within the ducts 80 is promoted by the flow of air into the ducts 80 from both ends and by the turbulence-promoting action of the breakers 116. Second, uniform discharge of air onto the entire upper surface of the article 170 is assured by the configuration, distribution, and location of the H-shaped orifices 112. As a result, the entire upper surface of the print plate or other article 170 being baked is uniformly heated with less than a 2° C. temperature variation there across.

After impinging on and heating the upper surface of the article 170 being baked, the air flows upwardly through the return ducts 82 to the return air chamber 88 located above the supply/return duct assembly 76. Air flows from this chamber 88, downwardly through the return passages 102 and 104, and into the heater element chamber 128, where it is reheated by the heater elements 156, and the process begins again.

The temperature to which the article 170 is heated or baked depends upon 1) the temperature and flow rate of the air recirculating through the oven 24, and 2) the speed at which the article 170 is conveyed through the oven 24. In a typical mode of operation, the air will be discharged from the blower 146 at a temperature of between 300° F. and 500° F. and at a flow rate of 1700 cubic feet per minute. The belt conveyor 64 normally moves at a speed of about 2–3 feet per minute. As a result, the print plate or other article 170 is heated to approximately 240° F. to 260° F. by the time it exits the cabinet 32, at which time is is cooled by the action of the cooling fans 164.

It can thus been seen that the configuration of and cooperation between the plenum 36, the cabinet 32, and the heat source 34 maximize uniformity of air distribution while minimizing the height of the oven 24, thereby providing a low-profile oven which provides precise and uniform heating of the articles being baked. Many changes and modifications could be made to the oven design without departing from the spirit of the invention. The scope of these changes will become apparent from the appended claims.

We claim:

1. A conveyor oven comprising:
   (A) a cabinet including a plurality of sidewalls and a top wall bridging said sidewalls, an entrance being formed in a first one of said sidewalls, and an exit being formed in a second one of said sidewalls;

(B) a conveyor which extends from said entrance to said exit, said conveyor having an upper surface along which travels an article to be baked;

(C) a source of heated air; and (D) a supply/return duct assembly which is positioned above said conveyor, said duct assembly having a lower surface which faces said upper surface of said conveyor, said duct assembly including (1) a plurality of supply ducts, each of which has (a) a heated air inlet in fluid communication with said source of heated air and (b) a plurality of downwardly-opening discharge orifices formed in said lower surface, (2) a supply passage assembly which directs heated air from said source of heated air to said supply ducts at opposite sides of said conveyor oven, and (3) a plurality of return ducts, each of which has at least one wall formed by a wall of an adjacent one of said supply ducts, each of said return ducts having (a) a lower inlet which faces said upper surface of said conveyor and (b) an upper outlet which is in fluid communication with said source of heated air.

2. A conveyor oven as defined in claim 1, further comprising a plenum which houses at least part of said source of heated air and which has an upper portion formed by said duct assembly, said supply passage assembly being formed within said plenum, and a return passage assembly being formed between said plenum and said cabinet for conveying air from said outlets of said return ducts to said source of heated air.

3. A conveyor oven comprising:

(A) a cabinet including a plurality of sidewalls and a top wall bridging said sidewalls, an entrance being formed in a first one of said sidewalls, and an exit being formed in a second one of said sidewalls;

(B) a conveyor which extends from said entrance to said exit, said conveyor having an upper surface along which travels an article to be baked;

(C) a source of heated air; and (D) a supply/return duct assembly which is positioned above said conveyor, said duct assembly having a lower surface which faces said upper surface of said conveyor, said duct assembly including (1) a plurality of supply ducts, each of which has (a) a heated air inlet in fluid communication with said source of heated air and (b) a plurality of downwardly-opening discharge orifices formed in said lower surface, and (2) a plurality of return ducts, each of which has at least one wall formed by a wall of an adjacent one of said supply ducts, each of said return ducts having (a) a lower inlet which faces said upper surface of said conveyor and (b) an upper outlet which is in fluid communication with said source of heated air, wherein said supply passage assembly comprises a first supply passage extending at least generally in parallel with a first one of said sidewalls of said cabinet, and further comprising a second supply passage disposed opposite said first supply passage and extending at least generally in parallel with a second one of said sidewalls of said cabinet, and wherein said source of heated air includes a blower having an axial inlet, a first radial outlet in fluid communication with said first supply passage, and a second radial outlet in fluid communication with said second supply passage.

4. A conveyor oven as defined in claim 3, wherein said duct assembly is essentially rectangular in transverse cross-section and in longitudinal cross-section, and wherein said duct assembly includes first and second longitudinally-opposed transverse end walls defining outer ends of said supply ducts and said return ducts and defining an inner edge of said first and second supply passages, said first and second end walls forming said inlets of said supply ducts, third and fourth longitudinally-opposed transverse end walls, said third and fourth end walls being disposed longitudinally beyond said first and second end walls, respectively, and defining an outer edge of said first and second supply passages and an inner edge of first and second return passages of said return passage assembly, first and second transversely-opposed edge walls extending longitudinally from said third end wall to said fourth end wall, each of said edge walls defining an outer wall of one of said ducts, and a plurality of intermediate walls extending longitudinally from said first end wall to said second end wall, each of said intermediate walls defining a transverse edge of both a supply duct and a return duct.

5. A conveyor oven as defined in claim 4, further comprising first and second seals disposed between said edge walls and said cabinet.

6. A conveyor oven as defined in claim 2, wherein said source of heated air further comprises a heating element positioned within said return passage assembly.

7. A conveyor oven as defined in claim 1, wherein said discharge orifices are generally H-shaped.

8. A conveyor oven as defined in claim 1, further comprising a plurality of cooling fans, disposed above said conveyor adjacent a discharge end thereof, which blow cooling air downwardly onto said conveyor.

9. A conveyor oven comprising:

(A) an insulated cabinet including a front sidewall, a rear sidewall, a pair of transverse sidewalls, and a top wall bridging said sidewalls;

(B) a plenum disposed in said cabinet, said plenum including an upper supply/return duct assembly and a lower housing, a conveyor passage being located vertically between said duct assembly and said housing and extending from an entrance formed in said front sidewall of said cabinet, through said plenum, and to an exit formed in said rear sidewall of said cabinet;

(C) a conveyor which extends through said conveyor passage, which has an inlet end positioned outside of said entrance of said conveyor passage, and which has a discharge end positioned outside of said exit of said conveyor passage, said conveyor having an upper surface along which travels an article to be baked, wherein (1) first and second supply passages are formed within said plenum on opposite transverse sides of said conveyor passage, (2) first and second return passages are formed between said plenum and said transverse sidewalls of said cabinet, (3) a third return passage is formed between said plenum and at least a lower portion of said front sidewall of said cabinet and is in fluid communication with said first and second return passages, and wherein (4) said duct assembly (a) has a lower surface which faces said upper surface of said conveyor, (b) has an upper surface which faces said top wall of said oven to define a return air chamber therebetween which is in fluid communication with said first and second return passages, and (c) includes
- (i) a plurality of supply ducts, each of which has a pair of longitudinally-spaced heated air inlets, each of which is in fluid communication with one of said first and second supply passages, and which has a plurality of downwardly-opening discharge orifices, and
- (ii) a plurality of return ducts, each of which has at least one longitudinal wall formed by a longitudinal wall of an adjacent one of said supply ducts, each of said return ducts having a lower inlet which faces said upper surface of said conveyor and an upper outlet which opens into said return air chamber; and (D) a source of heated air, said source of heated air including
- (1) a blower located in said housing of said plenum and having (a) an inlet in fluid communication with said third return passage and (b) first and second radial outlets, each of which is in fluid communication with a respective one of said first and second supply passages, and
- (2) a heating element located in said third return passage.

10. A conveyor oven as defined in claim 9, wherein said discharge orifices are generally H-shaped, having a length of about 2", a width of about 1", and a density of about 25 orifices per square foot.

11. A conveyor oven as defined in claim 9, wherein said duct assembly is essentially rectangular in transverse cross-section and in longitudinal cross-section, and wherein said duct assembly includes
- first and second longitudinally-opposed transverse end walls defining outer ends of said supply ducts and said return ducts and defining an inner edge of a respective one of said first and second supply passages, said first and second end walls being notched in a saw-tooth fashion so as to terminate at the bottom surfaces of said supply ducts to form said inlets of said supply ducts,
- third and fourth longitudinally-opposed transverse end walls, said third and fourth end walls being disposed longitudinally beyond said first and second end walls, respectively, and defining an outer edge of said first and second supply passages and an inner edge of said first and second return passages,
- first and second transversely-opposed edge walls which extend longitudinally from said third end wall to said fourth end wall, each of said edge walls defining an outer wall a return duct, and
- a plurality of intermediate walls which extend longitudinally from said first end wall to said second end wall, each of said intermediate walls defining a transverse edge of both a supply duct and a return duct.

12. An oven as defined in claim 11, further comprising a plurality of breakers, each of which extends transversely across an intermediate longitudinal section of one of said supply ducts and which essentially prevents airflow therepast, thereby separating said supply ducts into two distinct sections.

13. An oven as defined in claim 11, further comprising
- seals disposed between each of said edge walls and said cabinet, said seals comprising tadpole gaskets; and
- a first profile curtain disposed between said entrance in said front sidewall of said cabinet and said upper surface of said conveyor; and
- a second profile curtain disposed between said exit in said rear sidewall of said cabinet and said upper surface of said conveyor.

14. A print plate imaging and processing system, said system comprising:
- (A) a thermal imaging unit in which an image is thermally imposed on selected areas of the print plate to create image areas and non-image areas on the print plate;
- (B) a pre-bake oven, located downstream of said thermal imaging unit, in which the print plate is heated sufficiently to partially cross-link polymers in the non-image areas of the print plate;
- (C) a developer unit, located downstream of said pre-bake oven, in which the print plate is immersed in an aqueous alkaline developer; and
- (D) a finishing assembly, located downstream of said developer unit and including a rinse/gum unit, in which baking residues are removed from the print plate and in which a gum finisher is applied to the print plate, wherein said pre-bake oven includes
  - (1) a cabinet including a plurality of sidewalls and a top wall bridging said sidewalls, an entrance being formed in a first one of said sidewalls, and an exit being formed in a second one of said sidewalls;
  - (2) a conveyor which (a) has an upper surface along which travels the print plate, (b) receives the print plate from said thermal imaging unit, (c) conveys the print plate through said oven, and (d) forwards the print plate towards said developer unit; and
  - (3) a source of heated air; and
  - (4) a supply/return duct assembly which (a) is positioned above said conveyor, (b) receives heated air from said source of heated air at opposite sides of said pre-bake oven, (c) directs heated air downwardly onto said upper surface of said conveyor and the print plate so as to heat the print plate uniformly with less than a 2° C. temperature variation across the surface of the print plate, and (d) directs return air upwardly from the print plate and back to said source of heated air.

15. A system as defined in claim 14, wherein said duct assembly of said pre-bake oven (a) has a bottom surface which faces said upper surface of said conveyor and (b) includes
- a plurality of supply ducts, each of which has (i) a heated air inlet in fluid communication with said source of heated air and (ii) a plurality of downwardly-opening discharge orifices, and
- a plurality of return ducts, each of which has at least one wall formed by a wall of an adjacent one of said supply ducts, each of said return ducts having a lower inlet which faces said conveyor and an upper outlet which is in fluid communication with said source of heated air.

16. A print plate imaging and processing system, said system comprising:
- (A) a thermal imaging unit in which an image is thermally imposed on selected areas of the print plate to create image areas and non-image areas on the print plate;
- (B) a pre-bake oven, located downstream of said thermal imaging unit, in which the print plate is heated sufficiently to partially cross-link polymers in the non-image areas of the print plate;
- (C) a developer unit, located downstream of said pre-bake oven, in which the print plate is immersed in an aqueous alkaline developer; and
- (D) a finishing assembly, located downstream of said developer unit and including a rinse/gum unit, in which baking residues are removed from the print plate and in which a gum finisher is applied to the print plate, wherein said pre-bake oven includes (1) a cabinet including a plurality of sidewalls and a top wall bridging said sidewalls, an entrance being formed in a first one of said sidewalls, and an exit being formed in a second one of said sidewalls;

(2) a conveyor which (a) has an upper surface along which travels the print plate, (b) receives the print plate from said thermal imaging unit, (c) conveys the print plate through said oven, and (d) forwards the print plate towards said developer unit;

(3) a source of heated air; and (4) a supply/return duct assembly which (a) is positioned above said conveyor, (b) receives heated air from said source of heated air, (c) directs heated air downwardly onto said upper surface of said conveyor and the print plate so as to heat the print plate uniformly with less than a 2° C. temperature variation across the surface of the print plate, and (d) directs return air upwardly from the print plate and back to said source of heated air, wherein said duct assembly of said pre-bake oven (a) has a bottom surface which faces said upper surface of said conveyor and (b) includes a plurality of supply ducts, each of which has (i) a heated air inlet in fluid communication with said source of heated air and (ii) a plurality of downwardly-opening discharge orifices, and a plurality of return ducts, each of which has at least one wall formed by a wall of an adjacent one of said supply ducts, each of said return ducts having a lower inlet which faces said conveyor and an upper outlet which is in fluid communication with said source of heated air, wherein said duct assembly of said pre-bake oven further includes a top surface in which is formed said outlets of said return ducts, wherein a return air chamber is formed between said top surface of said duct assembly and said top wall of said cabinet, and wherein a return air passage is formed between said cabinet and said duct assembly and is in direct fluid communication with said return air chamber, wherein said duct assembly is essentially rectangular in transverse cross-section and in longitudinal cross-section, and wherein said duct assembly includes first and second longitudinally-opposed transverse end walls defining outer ends of said supply ducts and said return ducts and defining inner edges of first and second supply passages, said first and second end walls forming inlets of said supply ducts, third and fourth longitudinally-opposed transverse end walls, said third and fourth end walls being disposed longitudinally beyond said first and second end walls, respectively, and defining outer edges of said supply passages and inner edges of said return passages, first and second transversely-opposed edge walls extending longitudinally from said third end wall to said fourth end wall, each of said edge walls defining an outer wall of one of said return ducts, and a plurality of intermediate walls extending longitudinally from said first end wall to said second end wall, each of said intermediate walls defining a transverse edge of both a supply duct and a return duct.

17. A system as defined in claim 14, wherein said pre-bake oven further comprises a plurality of cooling fans, disposed above said upper surface of said conveyor adjacent said discharge end thereof, which blow cooling air downwardly onto said upper surface of said conveyor and the print plate.

18. A system as defined in claim 14, wherein said finishing assembly further comprises a post-bake oven, disposed between said developer unit and said rinse/gum unit, which heats the print plate sufficiently to completely cross-link the polymers in the image.

19. A method of baking a plate, said method comprising:

(A) conveying the plate into an oven using a conveyor extending through said oven;

(B) heating air via a source of heated air located within said oven beneath said conveyor;

(C) directing heated air into two opposed ends of a supply/return duct assembly which is located above said conveyor and which is in fluid communication with said source of heated air;

(D) directing heated air onto the plate from said duct assembly so as to heat the plate uniformly; then (E) directing return air upwardly from the plate, through said duct assembly, then downwardly around said conveyor, and then back to said source of heated air;

(F) conveying the plate out of said oven using said conveyor.

20. A method of baking a plate, said method comprising:

(A) conveying the plate into an oven using a conveyor extending through said oven;

(B) heating air via a source of heated air located within said oven beneath said conveyor;

(C) directing heated air onto the plate, from a supply/return duct assembly which is located above said conveyor and which is in fluid communication with said source of heated air, so as to heat the plate uniformly; then (D) directing return air upwardly from the plate, through said duct assembly, then downwardly around said conveyor, and then back to said source of heated air;

(E) conveying the plate out of said oven using said conveyor, wherein said step of directing heated air onto the plate comprises forcing said heated air radially from two radially-opposed outlets of a blower of said source of heated air, then forcing said heated air upwardly around opposed transverse edges of said conveyor and into opposed longitudinal ends of supply ducts of said duct assembly, and then forcing said heated air downwardly through discharge orifices in said supply ducts so as to impinge evenly on an entire upper surface of the plate.

21. A method as defined in claim 20, wherein said step of forcing said heated air downwardly through discharge orifices comprises forcing air through H-shaped discharge orifices.

22. A method as defined in claim 20, wherein said step of directing return air comprises drawing said return air upwardly through return air ducts positioned between said supply ducts, and then drawing said return air downwardly around said opposed transverse edges of said conveyor and then through a heating element of said source of heated air.

23. A method as defined in claim 19, further comprising cooling the plate after the plate exits said oven by blowing cooling air downwardly onto the plate using a plurality of cooling fans disposed above said conveyor adjacent said discharge end thereof.

24. A method as defined in claim 19, wherein said air is heated in said source of heated air, forced onto the plate, and returned to said source of heated air in a closed loop with essentially no heated air being exhausted from said oven and with essentially no ambient air being drawn into said oven.

25. A conveyor oven comprising:
- (A) a cabinet including a plurality of sidewalls and a top wall bridging said sidewalls, an entrance being formed in a first one of said sidewalls, and an exit being formed in a second one of said sidewalls;
- (B) a conveyor which extends from said entrance to said exit, said conveyor having an upper surface along which travels an article to be baked;
- (C) a source of heated air; and
- (D) a supply/return duct assembly which is positioned above said conveyor, said duct assembly having a lower surface which faces said upper surface of said conveyor, said duct assembly including
  - (1) a supply duct assembly which includes 1) opposed inlets located adjacent opposite sides of said conveyor oven and 2) a plurality of downwardly-facing outlets which direct heated air downwardly towards said upper surface of said conveyor,
  - (2) a supply passage assembly which directs heated air from said source of heated air into said inlets of said supply duct assembly,
  - (3) and a plurality of return ducts, each of which has a lower inlet which faces said upper surface of said conveyor and an upper outlet which is in fluid communication with said source of heated air.

* * * * *